(12) United States Patent
Peterson (10) Patent No.: US 8,232,915 B2
(45) Date of Patent: Jul. 31, 2012

(54) THREE QUARTER SPATIALLY VARIANT APODIZATION

(75) Inventor: Timothy T. Peterson, Culver City, CA (US)

(73) Assignee: Raytheon Company, Waltham, MA (US)

( * ) Notice: Subject to any disclaimer, the term of this patent is extended or adjusted under 35 U.S.C. 154(b) by 289 days.

(21) Appl. No.: 12/764,066

(22) Filed: Apr. 20, 2010

(65) Prior Publication Data

US 2011/0254728 A1    Oct. 20, 2011

(51) Int. Cl.
*G01S 13/00* (2006.01)
(52) U.S. Cl. ........ 342/192; 342/175; 342/195; 382/260; 382/280
(58) Field of Classification Search .................. 342/175, 342/192–195; 382/260, 280
See application file for complete search history.

(56) References Cited

U.S. PATENT DOCUMENTS

| | | | |
|---|---|---|---|
| 5,349,359 A | 9/1994 | Dallaire et al. | |
| 5,686,922 A | 11/1997 | Stankwitz et al. | |
| 6,298,363 B1 * | 10/2001 | Iannuzzelli | 708/400 |
| 7,348,917 B2 | 3/2008 | Stankwitz et al. | |
| 8,022,863 B1 * | 9/2011 | Nuthalapati | 342/189 |
| 2011/0133983 A1 * | 6/2011 | Connell et al. | 342/25 F |

* cited by examiner

*Primary Examiner* — Timothy A Brainard
(74) *Attorney, Agent, or Firm* — Christie, Parker & Hale, LLP (57) ABSTRACT

A new spatially variant apodization (SVA) algorithm that uses a 3/4 filled aperture prior to two dimensional discrete Fourier transform (2-D DFT) to form the image. The algorithm can be used, for example, to improve contrast and resolution on synthetic aperture radar (SAR) imagery, with a lower degree of oversampling (and thus, fewer pixels) than other algorithms require. This can translate into more efficient use of radar displays and processor memory. Additional efficiencies of memory and computing power may be realized when Automatic Target Recognition (ATR) algorithms operate on this imagery. Embodiments of this invention use convolution kernels at two different spacings, which are better tuned to the local phase relationships of mainlobe and sidelobes with a 3/4 filled aperture. As such, these embodiments suppress sidelobes without sacrificing resolution, at an aperture-filling ratio of 3/4, rather than 1/2, as is usually used.

14 Claims, 6 Drawing Sheets

THREE QUARTER SPATIALLY VARIANT APODIZATION

BACKGROUND OF THE INVENTION

1. Technical Field

The disclosed technology relates to image processing. More specifically, the disclosed technology relates to sidelobe suppression and pixel reduction in image processing.

2. Brief Description of the Related Art

Image processing of received antenna data (such as from a synthetic aperture radar) can be very computationally intensive. Some of this computation is directed to forming the image (converting analog antenna receiver data into digital image data, or pixels) while some is directed to interpreting the image. Converting the antenna data, for example, often involves Fourier transforms of the data, which introduces sidelobes (that interfere with the interpreting of the mainlobe, that is, the desired signal). On the other hand, interpreting the image often involves analyzing the pixels, whose analysis can grow as the square (or higher exponentiation) of the number of pixels, as well as the contrast and resolution of the pixels. Consequently, reducing sidelobes and the number of pixels while maintaining or improving contrast and resolution can enhance such image processing.

Synthetic aperture radar (SAR) is a type of imaging system that usually involves a moving platform (such as an aircraft or satellite) along with an antenna of relatively small aperture that is capable of continuously transmitting and receiving microwave beams of electromagnetic radiation, and a processing system (for example, a computer) to process the received signals. By scanning a region of interest continuously while moving, the SAR system is able to increase the effective aperture of its antenna by acquiring numerous signals of the same region of interest from different antenna locations. This leads to far better microwave imaging resolution than would be possible with a fixed antenna. However, the significant processing requirements (for example, normalizing the image to correct for things like curvature and Doppler effect) have kept SAR technology from being fully exploited until the capabilities of modern computing systems.

The SAR system works by synthetically increasing the aperture size of the antenna. By retaining both phase and magnitude of the backscattered echo signals, the SAR system can synthesize an antenna aperture of very long size, which leads to the improved resolution. This requires a significant amount of post-processing of the data, typically done with a digital computer.

Processing the image data can involve Fourier transforms, such as a discrete Fourier transform (DFT) or fast Fourier transform (FFT), of the data, but this can also introduce sidelobes (noise) to the mainlobe (data of interest). Sidelobes serve to obscure the target signal data (mainlobe) of interest. One way to reduce sidelobes is to introduce weighting of the signal magnitudes to lessen their impact, as is well known in the art (for example, Taylor weighting).

Figure 5:
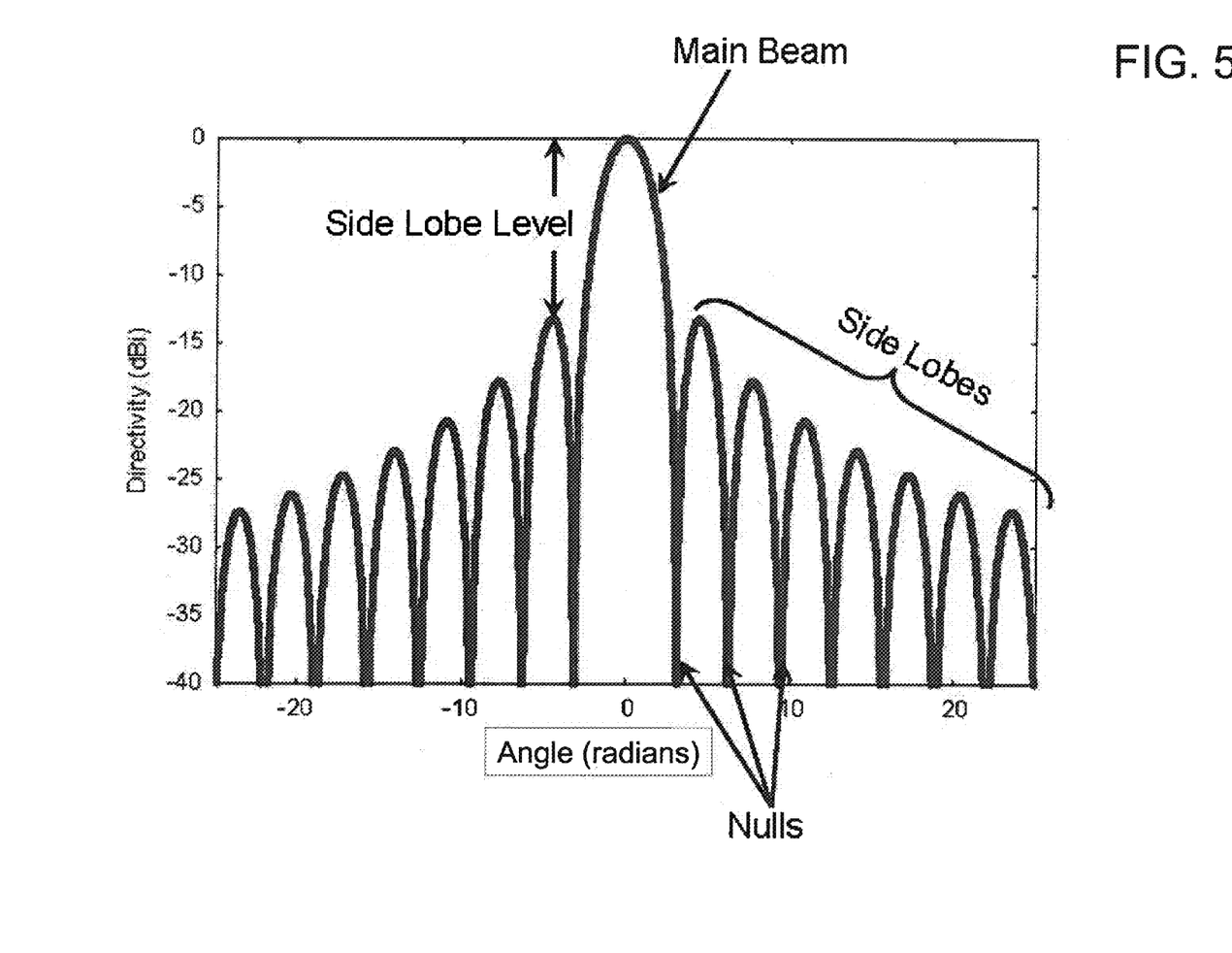
FIG. 5 is a depiction of the sidelobe phenomenon, in this case for a typical antenna used in SAR systems.

FIG. 5 is a depiction of the sidelobe phenomenon, in this case for a typical unweighted array. As can be seen in FIG. 5, there is a main beam of interest (that provides the desired signal data), but it creates noise in the form of sidelobes. The vertical axis represents relative signal strength in decibels (dB). Sidelobes from other nearby targets (with strong mainlobe signals) can obscure the weaker mainlobe data of targets of interest. For instance, the first sidelobe is only about 13 dB weaker than the mainlobe (see FIG. 5), while the second sidelobe is roughly 18 dB weaker.

Apodization is a form of weighting the image data to suppress the sidelobes, namely by taking the minimum envelope from several amplitude weightings. This enhances the processed image data. Spatially invariant reduction of sidelobes (e.g., Taylor weighting) has the drawback of widening the mainlobe, which reduces resolution. Spatially variant apodization (SVA) can reduce sidelobes without affecting the mainlobe. SVA is used, for example, in SAR image processing as a way to reduce sidelobes while maintaining resolution. SVA attempts to produce an optimal weighting for sidelobe reduction. SVA is spatially variant in that it tunes to local area signal relationships. SVA algorithms make use of phase relationships to suppress sidelobes in a manner that varies with the local neighborhood and is optimal in some sense.

Spatially variant apodization (SVA) is a digital image processing technique for suppressing sidelobes produced by Fourier transform of finite data sequences without affecting the mainlobe width. Dellaire et al., U.S. Pat. No. 5,349,359, entitled "Spatially Variant Apodization," the entire content of which is incorporated herein by reference. For example, these finite data sequences could represent SAR image data. This process allows each sample or pixel in an image to receive its own frequency domain aperture amplitude weighting function from an infinite number of possible weighting functions. Id.

SVA solutions may be described in terms of an "aperture" filling ratio. Image data may be represented, for example, as a two-dimensional array of complex numbers. Here, "aperture" does not refer to a radar antenna aperture, but instead refers to the size (number of entries) of the image data matrix prior to processing with the two-dimensional Fourier transform to form the image. See FIG. 6, which depicts a two-dimensional array of image data 60 prior to Fourier transform processing. The original (non-zero) data is in the aperture 62, while the zero-filled portion 64 surrounds the aperture 62. Typically, a synthetic aperture radar (SAR) flies through the sky, filling the array aperture with data in one-dimension.

Previous SVA solutions depend on an integer aperture filling ratio (e.g., 1, 1/2, 1/3, etc.), where the integer represents the amount of oversampling. This is the ratio of the non-zero data in the aperture to the full (i.e., Fourier transform) size including zero filling. Generally, the more zero-filled the matrix is prior to Fourier transform processing, the more interpolated the processed image ends up being. The unit ratio is seldom used in SAR processing; wrap-around and edge effects need to be managed, and users prefer a more highly oversampled image. The 1/2 ratio is most commonly used, however it results in nearly 2:1 oversampling of the image, and is wasteful of pixel real-estate, automatic target recognition (ATR) or other image processing, and memory loading. Higher integer ratios (e.g., 1/3, 1/4) only compound the oversampling phenomenon.

Thus, there is a need for an SVA image processing solution that minimizes oversampling yet manages wrap-around and edge effects.

SUMMARY OF THE INVENTION

To address the above problems, embodiments using a new spatially variant apodization (SVA) algorithm suitable for use in image processing and image enhancement are presented. The technique works with any rectangular coherent aperture in the spatial frequency domain. The SVA algorithm uses a 3/4 filled aperture prior to two-dimensional DFT to form the image. The 3/4 SVA algorithm (3/4 SVA) described here is an attempt to supply an SVA algorithm that works from a 3/4 aperture filling ratio, which is less wasteful of throughput and memory in ATR applications, and produces an image where the pixel spacing is about 85% of the resolution, which is comparable to the oversampling used with Taylor weighting (a traditional weighting function for sidelobe suppression, but is not spatially variant). This is because the 3/4 SVA does significantly less zero filling than with 1/2, 1/3, or higher (integer) ratios.

This algorithm can be used, for example, to improve contrast and resolution on Synthetic Aperture Radar (SAR) imagery, with a lower degree of oversampling than other algorithms require. That is, the algorithm attempts to produce the same or better image quality as with higher oversampling, only using coarser pixel spacing. This can translate into more efficient use of radar displays and processor memory. Additional efficiencies of memory and computing power may be realized when Automatic Target Recognition (ATR) algorithms operate on this imagery, because processing time increases as at least the square (and often the cube) of the number of pixels representing a target, so better contrast and fewer pixels greatly reduces this computational overhead.

Embodiments of this invention use convolution kernels at two different spacings, which are better tuned to the local phase relationships of mainlobe and sidelobes with a 3/4 filled aperture. There are two levels of phase testing, at two different spacings (one using 3×3 kernels spaced four samples apart and one using 3×3 kernels spaced two samples apart). The embodiments also suppress sidelobes without sacrificing resolution, at an aperture-filling ratio of 3/4, rather than 1/2, as is usually used. Since the aperture-filling ratio is linearly proportional to the ratio of pixel spacing to resolution, this allows for less highly oversampled imagery. For example, at an aperture-filling ratio of 1/2, the pixel spacing is about 56% of resolution, whereas at an aperture filling of 3/4, the pixel spacing is about 85% of resolution. This coarser spacing allows for more efficient use of system memory and for improved system throughput.

In an exemplary embodiment according to the present invention, a system for image processing of digital signal data is provided. The system includes a processor, a 3/4 spatially variant apodization (SVA) component that runs on the processor, and a storage device adapted to store the digital signal data and processed image data. The processor is adapted to read the digital signal data from the storage device into a matrix, enlarge and zero-fill the matrix for 3/4 SVA processing, apply a Fourier transform to the enlarged matrix to convert the signal data to the image domain, reduce sidelobes from the converted data using the 3/4 SVA component to selectively null or reduce a magnitude of the converted data, and store the processed image data on the storage device. The 3/4 SVA component is adapted to perform two levels of phase testing at different spacings.

The 3/4 SVA component may be further adapted to perform a first level of phase testing at a first spacing, perform thresholding of the first level of phase testing using a threshold factor to determine which nulls may be determined by comparison with a second level of phase testing, perform the second level of phase testing at a second spacing, and selectively determine whether to null or reduce each entry in the enlarged matrix by using the results of the phase testing and thresholding to produce processed image data.

The first spacing may be four samples apart and the second spacing may be two samples apart.

The threshold factor may be approximately 0.55.

The image data may be acquired with a synthetic aperture radar.

The digital signal data may be in the spatial frequency domain.

The Fourier transform may be a two-dimensional (2-D) Fourier transform.

In another exemplary embodiment according to the present invention, a method of image processing by a processor of digital signal data stored on a storage device is provided. The method includes reading the matrix of digital signal data from the storage device into a matrix, enlarging and zero-filling the matrix for use with a 3/4 spatially variant apodization (SVA) algorithm, performing Fourier transform processing of the enlarged matrix to convert the signal data to the image domain, reducing the sidelobes in the converted data using the 3/4 SVA algorithm to selectively null or reduce a magnitude of the converted data, and storing the processed image data on the storage device. The using the 3/4 SVA algorithm to selectively null or reduce the magnitude of the converted data includes performing two levels of phase testing at different spacings.

The performing of the two levels of phase testing at different spacings may include performing a first level of phase testing at a first spacing, performing thresholding of the first level of phase testing using a threshold factor to determine which nulls may be determined by comparison with a second level of phase testing, performing the second level of phase testing at a second spacing, and selectively determining whether to null or reduce each entry in the enlarged matrix by using the results of the phase testing and the thresholding to produce processed image data.

The first spacing may be four samples apart and the second spacing may be two samples apart.

The threshold factor may be approximately 0.55.

The digital signal data may be acquired from a synthetic aperture radar.

The digital signal data may be in the spatial frequency domain.

The Fourier transform may be a two-dimensional (2-D) Fourier transform.

BRIEF DESCRIPTION OF THE DRAWINGS

The accompanying drawings illustrate embodiments of the present invention, and together with the description, serve to explain the principles of the embodiments of the present invention.

DETAILED DESCRIPTION

Exemplary embodiments of the present invention will now be described in more detail with reference to the accompanying drawings.

Figure 1:
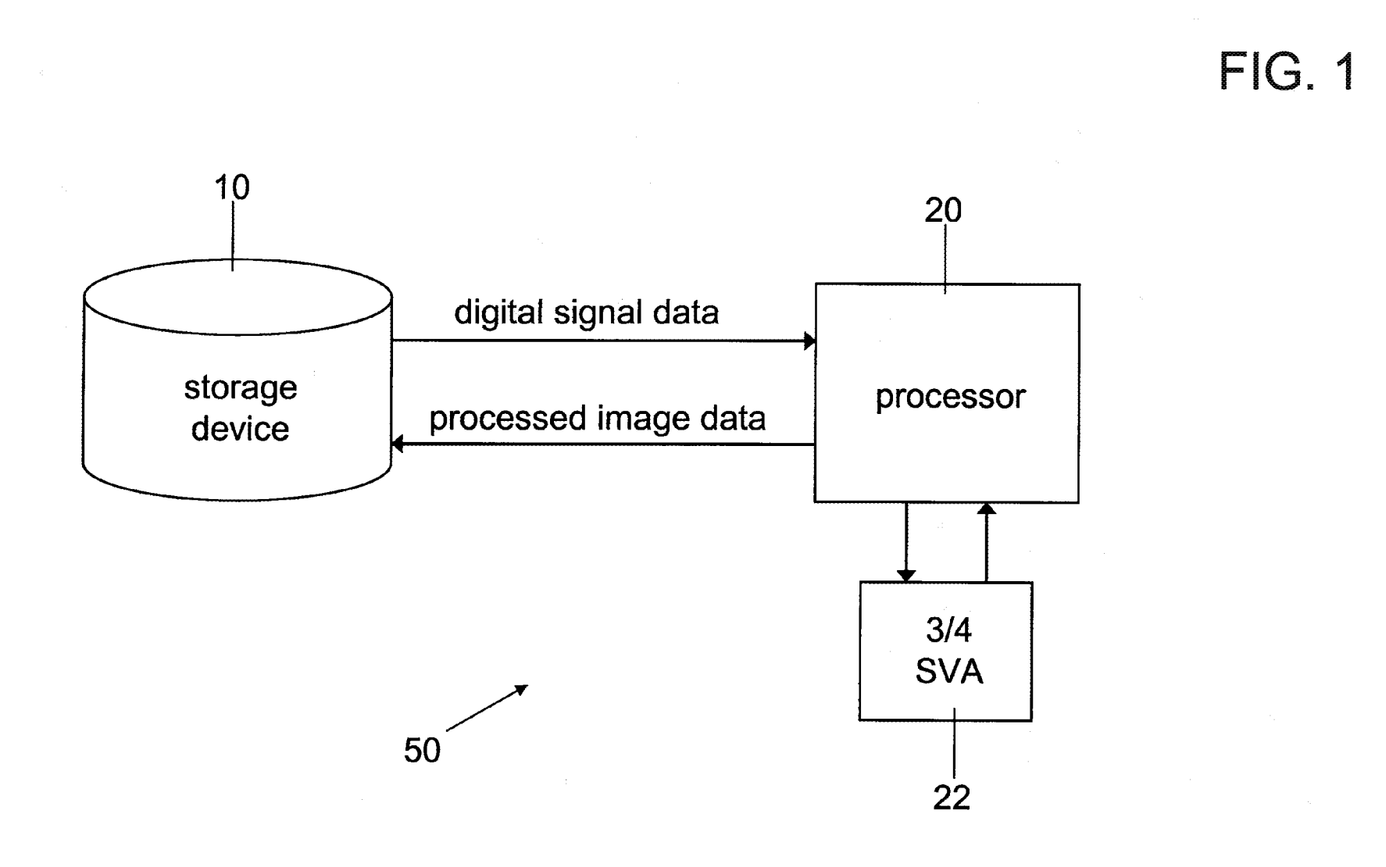
FIG. 1 is an image processing system according to an exemplary embodiment.

FIG. 1 is an image processing system according to an exemplary embodiment of the present invention.

Referring now to FIG. 1, an image processing system 50 using 3/4 SVA is shown. The image processing system 50 includes a storage device 10 adapted to stored sensed signal data and processed image data, a processor 20, and a 3/4 SVA component 22 adapted to run on the processor 20 and do 3/4 SVA processing to the image data.

In more detail, sensed digital signal data—for example, from a synthetic aperture radar (SAR)—is stored on storage device 10. Assume, for simplicity, that the digital signal data represents image signal data in the spatial frequency domain (the technique should work with any rectangular coherent aperture in the spatial frequency domain). The digital signal data is stored in a two-dimensional matrix, each two-variable entry representing a sample point.

Figure 6:
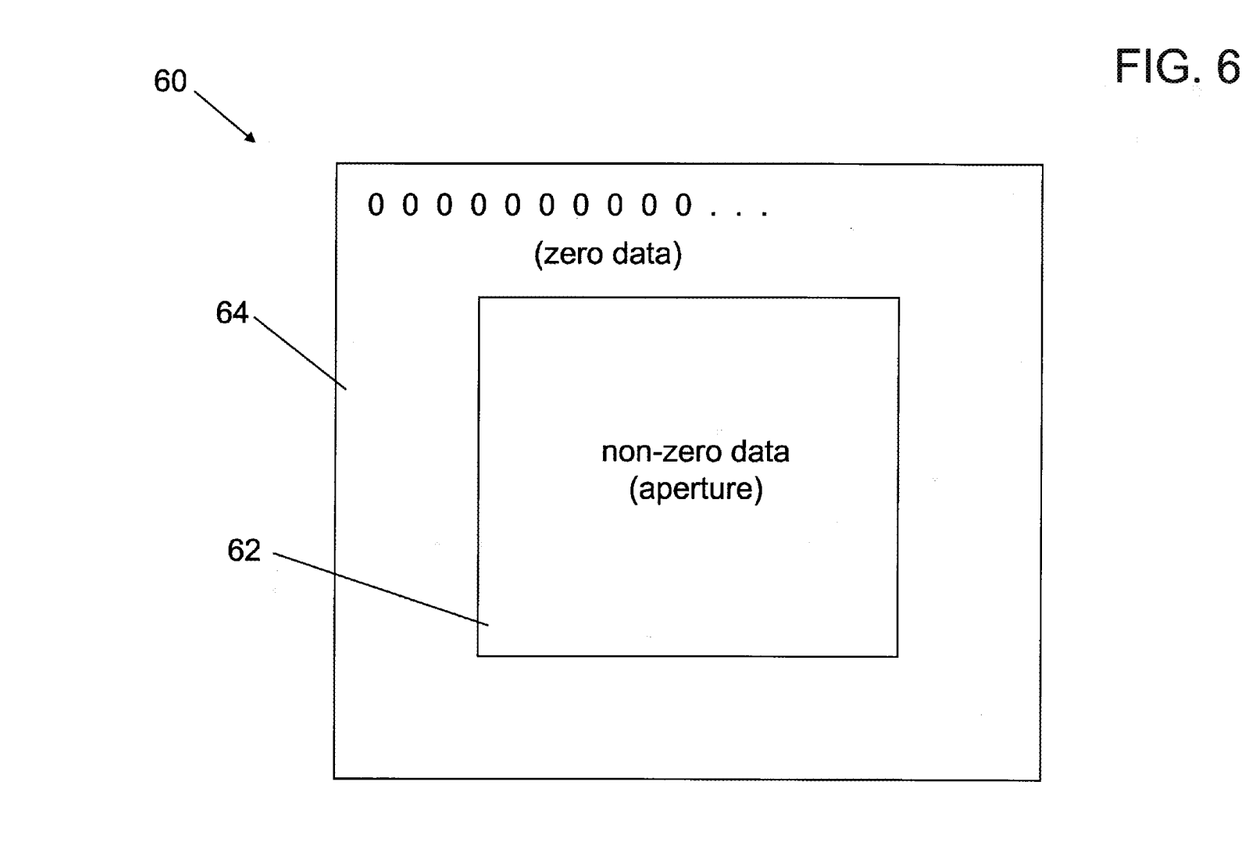
FIG. 6 shows a two-dimensional matrix of image data prior to Fourier transform processing.

Prior to two-dimensional (2-D) Fourier transform processing (to convert the data to the image domain), the matrix is enlarged (over-sampled) by a 4/3 ratio and zero-filled, as shown in FIG. 6, which shows an enlarged matrix 60 that includes the original digital signal data 62 (also referred to as the "aperture") and the zero portion 64 that surrounds the original data 62. 2-D Fourier transform processing is done to the matrix to convert the data to the image domain.

Next, the 3/4 SVA algorithm is performed on the data, which includes two levels of phase testing:
1. 3×3 kernels spaced four samples apart (three such kernels)
2. 3×3 kernels spaced two samples apart (four such kernels)

Testing is first performed relative to the four-sample spaced kernels, and then a thresholding is performed to determine which nulls may be determined by comparison with the two-sample spaced kernels. All cells not determined to be nulls in either level of testing, or which fail the thresholding, are determined as the minimum of the cell under test, and the four-sample spaced convolution products. The details of the 3/4 SVA algorithm are provided later. This produces the final processed image data, which is then stored on the storage device 10.

Figure 2:
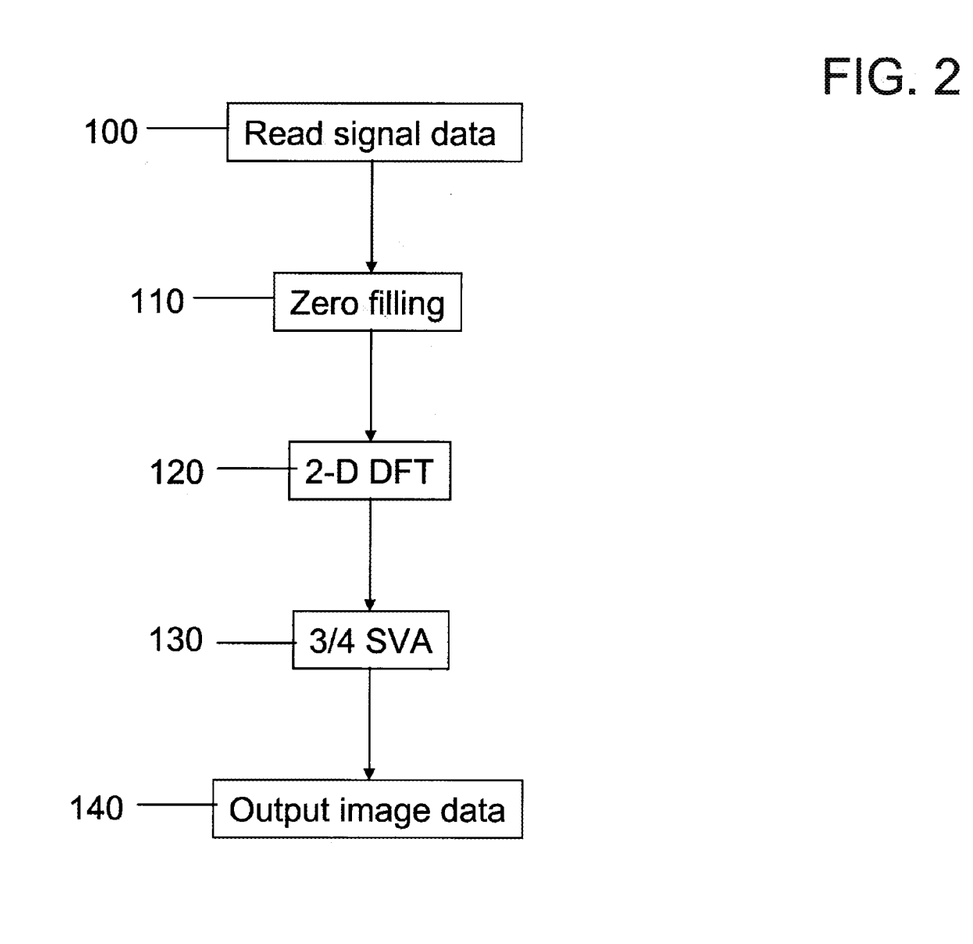
FIG. 2 is an image processing method according to an exemplary embodiment.

FIG. 2 depicts an exemplary image processing method using 3/4 SVA on a processor, where the unprocessed signal data and the processed image data are stored on a storage device. The method starts with step 100, reading the signal data from the storage device. For simplicity, the signal data can be assumed to be in digital form in the spatial frequency domain and stored in a matrix. Next, in step 110, the matrix is enlarged by a 4/3 ratio and zero-filled, to prepare for oversampling processing and 3/4 SVA. Then, in step 120, a 2-D discrete Fourier transform (DFT) is applied to the data, to convert it to the image domain.

Since the DFT step 120 introduces sidelobes to the data, the method continues with step 130, 3/4 SVA processing, which suppresses the sidelobes without widening the mainlobe while maintaining at least as good image contrast. The details of the 3/4 SVA algorithm are discussed below. Finally, in step 140, the processed image data is output to the storage device.

The Algorithm

What follows is a functional description of the 3/4 SVA algorithm.

The 3/4 SVA algorithm operates on a complex image, $X(m,n)$, where $X$ is an M×N matrix with indices m= 0, 1, ..., M−1 and n=0, 1, ..., N−1.

A number of two-dimensional (2-D) convolution products with various convolution kernels are formed. Let $$xpp2(m, n) = \sum_{i=-1}^{1} \sum_{j=-1}^{1} 2^{-(|i|+|j|)} K_{xpp2}(i, j) X(m - 2i, n - 2j) \quad (1)$$

represent a convolution product with coefficients spaced two samples apart.

In similar fashion, three more convolution products, with coefficients spaced two samples apart, can also be formed. By use of equation (1), these four products, xpp2, xpm2, xmp2, and xmm2, are determined by specifying their sign kernels:

xpp2 has kernel $$K_{xpp2}(i, j) = \begin{bmatrix} 1 & 1 & -1 \\ 1 & 1 & -1 \\ -1 & -1 & 1 \end{bmatrix},$$

while xpm2 has kernel $$K_{xpm2}(i, j) = \begin{bmatrix} -1 & 1 & 1 \\ -1 & 1 & 1 \\ 1 & -1 & -1 \end{bmatrix},$$

xmp2 has kernel $$K_{xmp2}(i, j) = \begin{bmatrix} -1 & -1 & 1 \\ 1 & 1 & -1 \\ 1 & 1 & -1 \end{bmatrix},$$

and xmm2 has kernel $$K_{xmm2}(i, j) = \begin{bmatrix} 1 & -1 & -1 \\ -1 & 1 & 1 \\ -1 & 1 & 1 \end{bmatrix}.$$

Three more convolution kernels are formed at a spacing of four samples, as $$xpp4(m, n) = \sum_{i=-1}^{1} \sum_{j=-1}^{1} 2^{-(|i|+|j|)} K_{xpp4}(i, j) X(m - 4i, n - 4j) \quad (2)$$

Once again, by use of equation (2), these three products, xpp4, xpm4, and xmp4, can be specified through their sign kernels:

xpp4 has kernel $$K_{xpp4}(i, j) = \begin{bmatrix} 1 & 1 & 1 \\ 1 & 1 & 1 \\ 1 & 1 & 1 \end{bmatrix},$$

while xpm4 has kernel $$K_{xpm4}(i, j) = \begin{bmatrix} -1 & 1 & -1 \\ -1 & 1 & -1 \\ -1 & 1 & -1 \end{bmatrix},$$

and xmp4 has kernel $$K_{xmp4}(i, j) = \begin{bmatrix} -1 & -1 & -1 \\ 1 & 1 & 1 \\ -1 & -1 & -1 \end{bmatrix}.$$

Note that each complex pixel X(m,n) has three corresponding values, xpp4(m,n), xpm4(m,n), xmp4(m,n), formed by a 2-D convolution as specified in equation (2). The four kernels based on two-sample spacing, xpp2(m,n), xpm2(m,n), xmp2(m,n), and xmm2(m,n), are also available.

The operation of the 3/4 SVA algorithm can be depicted as $$X(m,n) \xrightarrow{3/4\ SVA} X'(m,n).$$

The operation of 3/4 SVA is performed separately and equivalently on the real and imaginary components of X(m, n). Without loss of generality, we need only specify the algorithm on the real part.

$$\text{Let}\ \{ALL\} = \{(m,n)\ |\ m \in \{0, 1, \ldots, M-1\}\ \text{and}\ n \in \{0, 1, \ldots, N-1\}\}$$

and $$\{SS\} = \left\{ \begin{array}{l} (m,n)\ |\ \text{Re}(X(m,n))\cdot\text{Re}(xpp4(m,n)) > 0\ \text{and} \\ \text{Re}(X(m,n))\cdot\text{Re}(xpm4(m,n)) > 0\ \text{and} \\ \text{Re}(X(m,n))\cdot\text{Re}(xmp4(m,n)) > 0 \end{array} \right\}.$$

$$\text{Let}\ \{M55\} = \left\{ \begin{array}{l} (m,n)\ |\ (m,n) \in \{SS\}\ \text{and} \\ \min(|\text{Re}(xpm4(m,n))|, |\text{Re}(xmp4(m,n))|) < \\ 0.55|\text{Re}(xpp4(m,n))| \end{array} \right\}$$

and $$\{Z2\} = \left\{ \begin{array}{l} (m,n)\ |\ (m,n) \in \{M55\}\ \text{and}\ \text{Re}(X(m,n))\cdot\text{Re}(xpp2(m,n)) > 0 \\ \text{and}\ \text{Re}(X(m,n))\cdot\text{Re}(xpm2(m,n)) > 0 \\ \text{and}\ \text{Re}(X(m,n))\cdot\text{Re}(xmp2(m,n)) > 0 \\ \text{and}\ \text{Re}(X(m,n))\cdot\text{Re}(xmm2(m,n)) > 0 \end{array} \right\}.$$

The threshold factor of 0.55 above can be empirically adjusted; greater values enhance edge delineation at the expense of preserving soft graduated transitions. Then Re(X'(m,n))=0 when (m,n)∈{$\overline{\{Z2\}}$∩{M55}}∪$\overline{\{SS\}}$. Otherwise, when (m,n)∈{Z2}∪{{SS}∩$\overline{\{M55\}}$}, $$\text{Re}(X'(m,n)) = \text{Re}(X(m,n))\ \text{when}\ |\text{Re}(X(m,n))| <$$
$$\min(|\text{Re}(xpp4(m,n))|, |\text{Re}(xpm4(m,n))|, |\text{Re}(xmp4(m,n))|),$$

$$\text{Re}(X'(m,n)) = \text{Re}(xpp4(m,n))\ \text{when}\ |\text{Re}(xxp4(m,n))| <$$
$$\min(|\text{Re}(X(m,n))|, |\text{Re}(xpm4(m,n))|, |\text{Re}(xmp4(m,n))|),$$

$$\text{Re}(X'(m,n)) = \text{Re}(xpm4(m,n))\ \text{when}\ |\text{Re}(xpm4(m,n))| <$$
$$\min(|\text{Re}(X(m,n))|, |\text{Re}(xpp4(m,n))|, |\text{Re}(xmp4(m,n))|),$$

$$\text{and}\ \text{Re}(X'(m,n)) = \text{Re}(xmp4(m,n))\ \text{when}\ |\text{Re}(xmp4(m,n))| <$$
$$\min(|\text{Re}(X(m,n))|, |\text{Re}(xpp4(m,n))|, |\text{Re}(xpm4(m,n))|).$$

In this way, all the Real values of X'(m,n) are assigned. The algorithm is run equivalently on the imaginary components.

The essential features of this algorithm are two levels of phase testing, the first dependent on 3×3 convolution kernels spaced four samples apart, and the second dependent on 3×3 convolution kernels spaced two samples apart. The threshold when second-level testing is required is controlled by ratios of amplitudes among the convolution results using the four-sample spaced kernels. Real and imaginary components are treated separately, and the final output either is chosen from the signed, minimum magnitude value of the original data and the convolution results using four-sample spaced kernels, or is zero.

Figure 3:
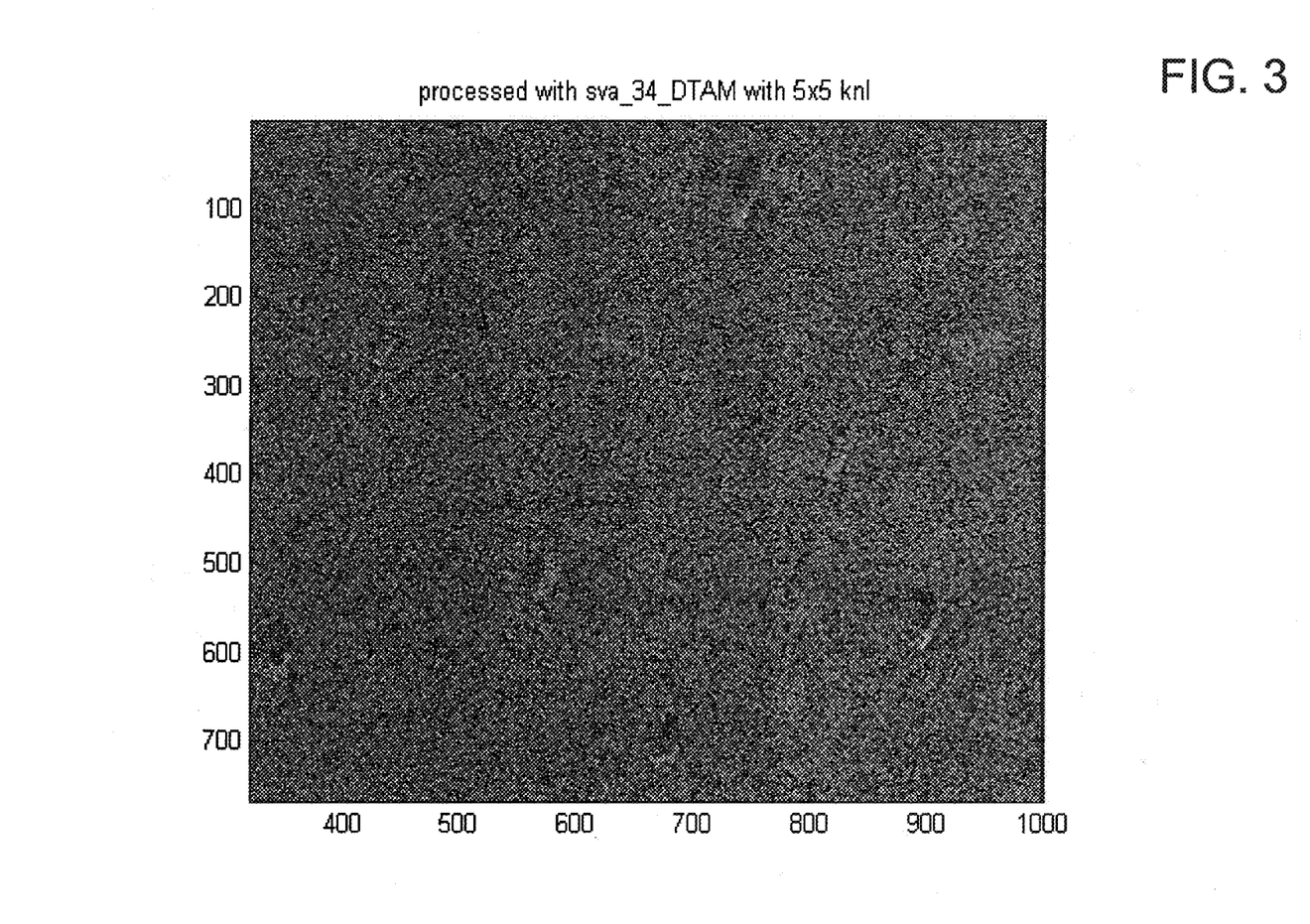
FIG. 3 is a SAR 1-foot image (one-foot resolution per pixel) after processing with an exemplary embodiment.
Figure 4:
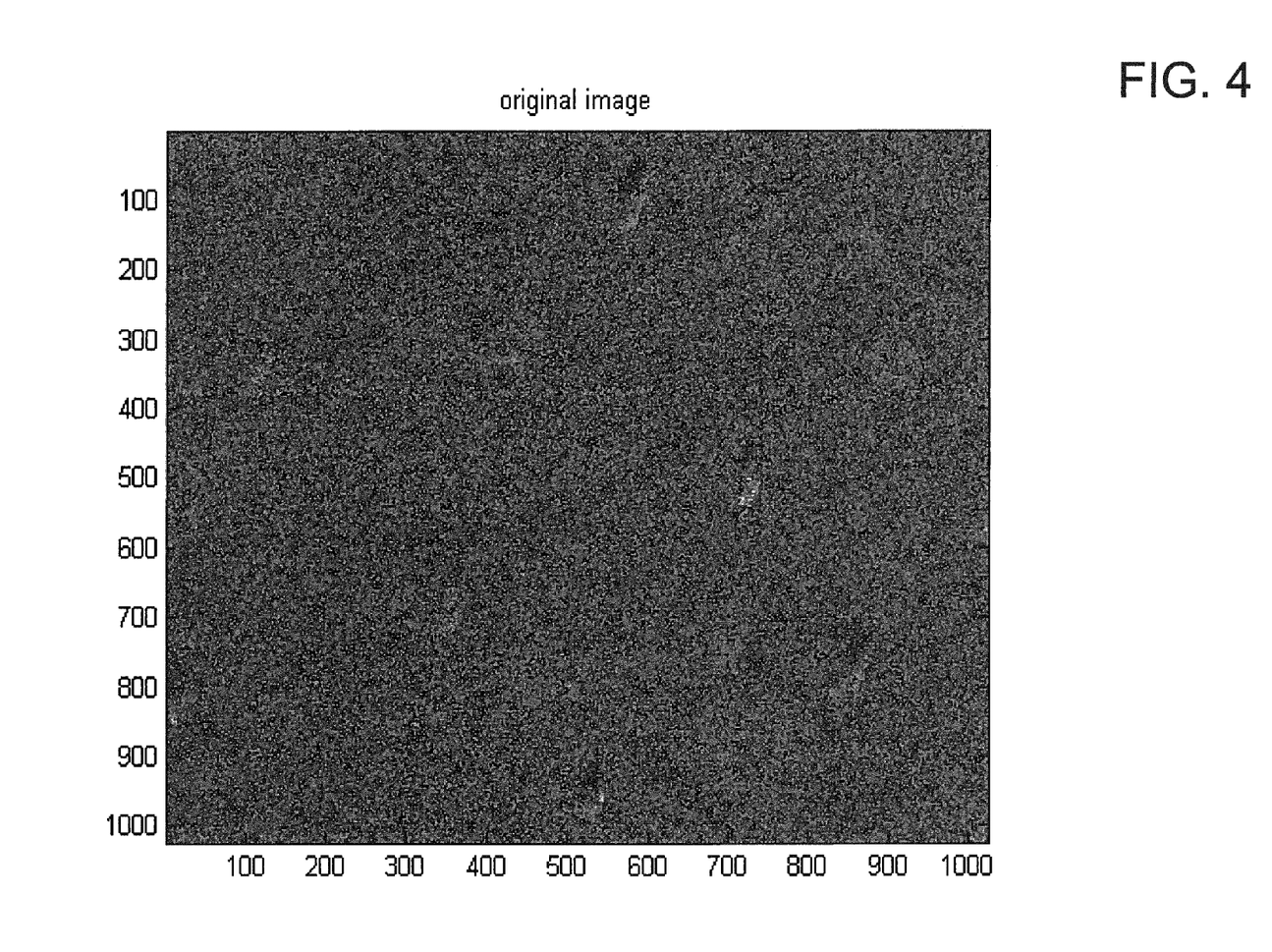
FIG. 4 is the same SAR 1-foot image depicted in FIG. 3, only processed with a 1/2 filled aperture and a conventional SVA algorithm.

FIGS. 3-4 depict two exemplary SAR 1-foot images (that is, one foot resolution) of sample targets (e.g., vehicles), formed from the same collection, taken Mar. 24, 2005 using the Raytheon Multi-Program Test-Bed (RMT) at Eglin AFB. The SAR image in FIG. 3 was re-processed using an exemplary embodiment of the present invention, while FIG. 4 was processed using the 1/2 filled aperture and the usual SVA algorithm. The results of both SVA operations were dual apodized with the output of a small kernel convolved with the un-weighted image, for speckle reduction.

As can be seen, though both FIGS. 3 and 4 represent the same processed image, FIG. 3 (the 3/4 SVA processed image) is able to produce at least as good a quality image (indeed, some targets are even more distinguishable due to sharper edges and better contrast) with significantly fewer pixels. In fact, pixel spacing in FIG. 4 is about 56% of resolution, while it is about 85% in FIG. 3 using the 3/4 SVA algorithm (roughly a 52% increase in pixel spacing, which translates to almost a 57% reduction in the number of pixels). The reduced pixel count significantly improves post image formation processing, such as Automatic Target Recognition (ATR), whose processing requirements grow significantly (square or higher exponentiation) with the number of pixels. For example, some ATR algorithms run as the cube of the number of pixels being processed. This pixel reduction leads to such benefits as cutting target identification time, improving accuracy of target identification, etc.

Although certain exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for image processing of digital signal data, the system comprising:
    a processor;
    a 3/4 spatially variant apodization (SVA) component that runs on the processor; and
    a storage device adapted to store the digital signal data and processed image data,
    wherein the processor is adapted to:
        read the digital signal data from the storage device into a matrix;
        enlarge and zero-fill the matrix for 3/4 SVA processing;
        apply a Fourier transform to the enlarged matrix to convert the signal data to the image domain;
        reduce sidelobes from the converted data using the 3/4 SVA component to selectively null or reduce a magnitude of the converted data, wherein the 3/4 SVA component is adapted to perform two levels of phase testing at different spacings; and
        store the processed image data on the storage device.

2. The system of claim 1, wherein the 3/4 SVA component is further adapted to:
    perform a first level of phase testing at a first spacing;
    perform thresholding of the first level of phase testing using a threshold factor to determine which nulls may be determined by comparison with a second level of phase testing;
    perform the second level of phase testing at a second spacing; and selectively determine whether to null or reduce each entry in the enlarged matrix by using the results of the phase testing and thresholding to produce processed image data.

3. The system of claim 2, wherein the first spacing is four samples apart and the second spacing is two samples apart.

4. The system of claim 2, wherein the threshold factor is approximately 0.55.

5. The system of claim 1, wherein the image data is acquired with a synthetic aperture radar.

6. The system of claim 1, wherein the digital signal data is in the spatial frequency domain.

7. The system of claim 1, wherein the Fourier transform is a two-dimensional (2-D) Fourier transform.

8. A method of image processing by a processor of digital signal data stored on a storage device, the method comprising:
    reading the matrix of digital signal data from the storage device into a matrix;
    enlarging and zero-filling the matrix for use with a 3/4 spatially variant apodization (SVA) algorithm;
    performing Fourier transform processing of the enlarged matrix to convert the signal data to the image domain;
    reducing the sidelobes in the converted data using the 3/4 SVA algorithm to selectively null or reduce a magnitude of the converted data, comprising performing two levels of phase testing at different spacings; and
    storing the processed image data on the storage device.

9. The method of claim 8, wherein the performing two levels of phase testing at different spacings comprises:
    performing a first level of phase testing at a first spacing;
    performing thresholding of the first level of phase testing using a threshold factor to determine which nulls may be determined by comparison with a second level of phase testing;
    performing the second level of phase testing at a second spacing; and
    selectively determining whether to null or reduce each entry in the enlarged matrix by using the results of the phase testing and the thresholding to produce processed image data.

10. The method of claim 9, wherein the first spacing is four samples apart and the second spacing is two samples apart.

11. The method of claim 9, wherein the threshold factor is approximately 0.55.

12. The method of claim 8, wherein the digital signal data is acquired from a synthetic aperture radar.

13. The method of claim 8, wherein the digital signal data is in the spatial frequency domain.

14. The method of claim 8, wherein the Fourier transform is a two-dimensional (2-D) Fourier transform.

\* \* \* \* \*